Patented Nov. 22, 1938

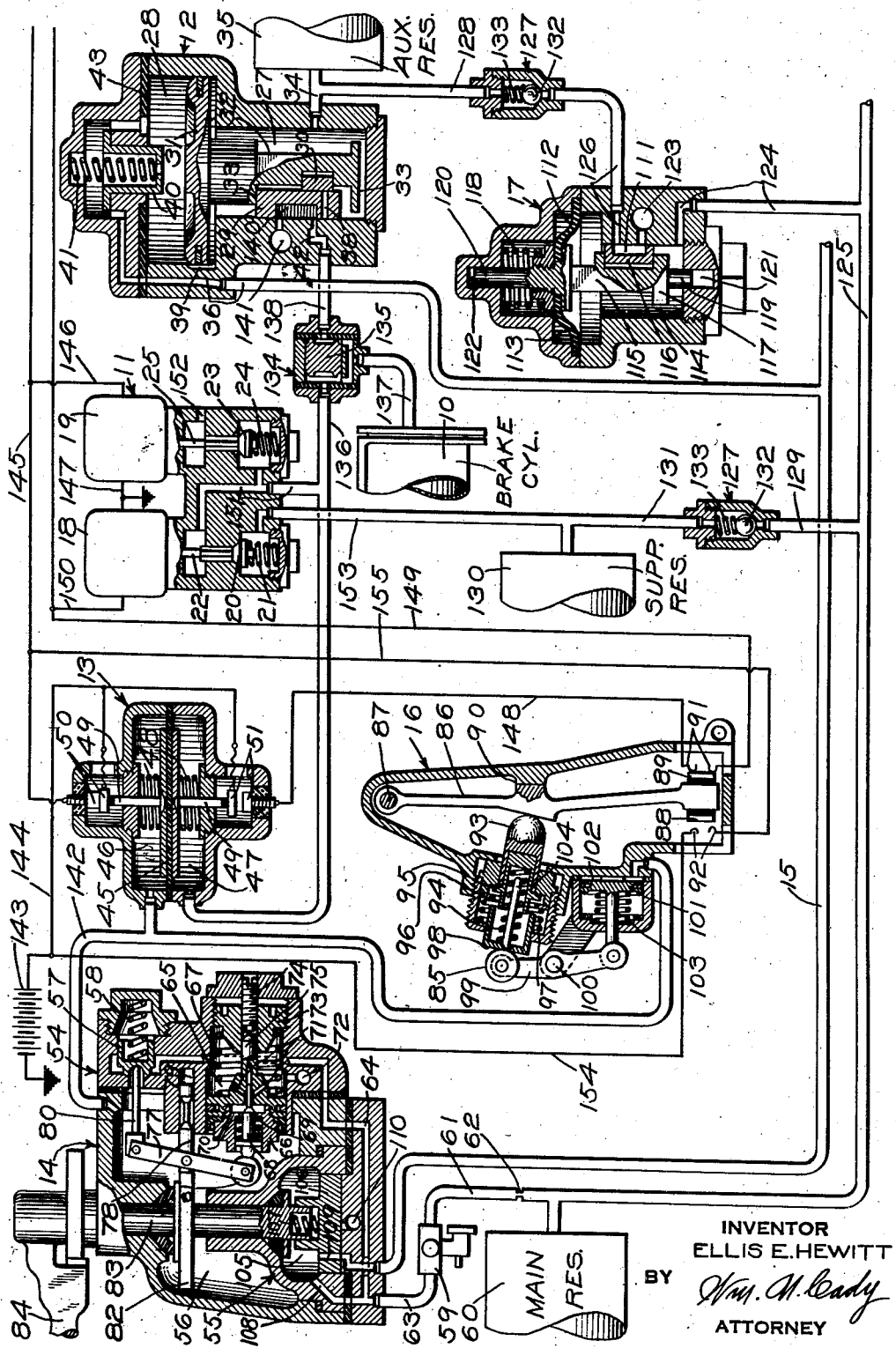

2,137,228

UNITED STATES PATENT OFFICE 2,137,228

TRAIN BRAKE EQUIPMENT

Ellis E. Hewitt, Edgewood, Pa., assignor to The Westinghouse Air Brake Company, Wilmerding, Pa., a corporation of Pennsylvania Application October 2, 1935, Serial No. 43,143

14 Claims. (Cl. 303—24)

This invention relates to train brake equipments, and more particularly to brake equipments for high speed trains and traction vehicles, such for example as is described and claimed in my copending application Serial No. 741,063, filed August 23, 1934.

In the copending application above referred to, I have disclosed a brake equipment for high speed trains and traction vehicles in which applications may be effected electropneumatically by straight air operation or automatically upon reduction of pressure in a normally charged pipe. In addition, I have shown the adaptation of a retardation controller device for limiting the rate of retardation which may be produced by an application of the brakes.

With the type of retardation controller device disclosed in the said copending application, the adjustment of the device is such that during service applications of the brakes the device can function to prevent the rate of retardation from exceeding some one chosen value only, while in an emergency application it can prevent rates above some one higher value only. With such limited adjustment, when the retardation controller device assumes control of the application the control by the operator at the brake valve or brake controller is limited, as he can not thereafter increase the degree of brake application, but may decrease it only. Under such circumstances the operator may not be able to bring the train or vehicle to a stop at some predetermined point, nor may he be able to stop the trains in the shortest possible distance permitted by track conditions.

In order that the operator may have full control over the brake application at all times, it is highly desirable that he should be able to alter the adjustment of the retardation controller device as his judgment dictates, so that he may make stops at desired points or in the shortest possible distance. To accomplish this the adjustment of the retardation controller device should be in response to and under the control of the operator's brake valve or brake controller device. It is therefore an object of the present invention to provide a brake equipment in which the adjustment of the retardation controller device is directly under the control of the operator in response to manual manipulation of the brake valve device.

It is a cardinal principal of safety that a railway train or vehicle should never be put into operation until the brakes thereon are fully conditioned to produce a brake application when desired. Therefore, in equipments such as illustrated in the aforesaid copending application where brake applications may be made by reducing the pressure in a charged pipe and releasing the application by again restoring the pressure in said pipe, the train or vehicle should not be put into operation until the pipe and associated equipment have been charged to a degree such that a brake application can readily be made.

It is a further object of this invention to provide a fluid pressure brake equipment in which during initial charging of the equipment the brakes are automatically applied and held applied until the equipment will have been charged to a pressure at or above a predetermined value, which value is to a degree such that a brake application may be made readily and to a degree sufficient to insure stopping of the train or vehicle.

Other objects and advantages of the invention, dealing with specific construction and arrangement of parts, will be more fully understood from the following description, which is taken in connection with the single figure of the attached drawing showing one embodiment of the invention.

Referring now to this drawing, I have shown the invention as embodied in a simple form of combined straight air and automatic brake equipment, but it will be understood by those skilled in the art that the invention may be adapted to a number of types of brake equipments, and in particular to the type disclosed in my said copending application Serial No. 741,063.

In the embodiment here illustrated, I have shown a brake equipment having a brake cylinder 10 to which fluid under pressure may be supplied by operation of a magnet valve device 11 during electropneumatic or straight air operation, or by operation of an automatic valve device 12 during automatic operation.

A pneumatic switch device 13 is provided for controlling operation of the magnet valve device 11, and a brake valve device 14 is provided to control operation of the switch device 13. The brake valve device 14 also controls the pressure in a brake pipe 15 to control operation of the automatic valve device 12.

A retardation controller device 16 is provided for limiting the rate of retardation which may be produced by an application of the brakes during electropneumatic or straight air operation.

An application holding valve device 17 is provided to effect an application of the brakes during initial charging of the equipment, and to maintain the application until the brake pipe 15 will have been charged to or above a predetermined value.

Considering now more in detail the devices and apparatus above referred to, the magnet valve device 11 comprises an application portion 18 and a release portion 19. The application portion 18 consists of a supply valve 20 urged toward a seated position by a spring 21, and adapted to be actuated to an unseated position upon energization of an application electromagnet in the upper part of the valve device casing, which when energized actuates a stem 22 downwardly to unseat the valve.

The release portion 19 consists of a release valve 23 which is urged toward a seated position by a spring 24, and which is adapted to be actuated to an unseated position upon energization of a release electromagnet in the upper part of the casing, which when energized actuates a stem 25 downwardly to unseat the valve.

The automatic valve device 12 is embodied in a casing having a slide valve chamber 27 and a piston chamber 28. Disposed in the slide valve chamber 27 is a main slide valve 29 and positioned on top of the main slide valve is a graduating valve 30. For operating the main and graduating valves there is disposed in the piston chamber 28 a piston 31 having a stem 32 recessed to receive the graduating valve 30 so as to move it coextensively therewith, and having shoulders 33 for engaging the main slide valve 29 after a lost motion movement, so as to shift this valve between a release position and an application position.

The slide valve chamber 27 is connected by pipe 34 to an auxiliary reservoir 35, while the piston chamber 28 is connected by pipe and passage 36 to the aforementioned brake pipe 15. When the brake pipe 15 is charged to normal value of pressure, piston 31 will be maintained in the position shown in the drawing, and in this position the graduating valve 30 will blank a port 38 in the main slide valve 29. At the same time, piston chamber 28 is in communication with slide valve chamber 27 by way of feed groove 39, so that the auxiliary reservoir 35 may be charged from the brake pipe 15.

When a service reduction in brake pipe pressure is effected, the piston 31 will move upwardly due to the overbalancing pressure therebelow until it engages a graduating stop 40, which is urged downwardly by a spring 41. When the piston engages the graduating stop it is arrested, and in this position of the piston the graduating valve 30 uncovers port 38 while the main slide valve 29 has been shifted to a service application position where port 38 registers with a choked passage 42.

If, however, an emergency reduction in brake pipe pressure is effected, the overbalancing pressure below piston 31 will be great enough to compress the graduating spring 41 and move piston 31 upwardly until it seals against gasket 43. In this position of the piston, the main slide valve 29 will have been shifted to emergency position, where it will have uncovered the choked passage 42.

When the pressure in the brake pipe 15 is restored to normal, piston 31 will return to the release position shown in the drawing, and the main and graduating valves will again be positioned as shown.

The pneumatic switch device 13 is embodied in a casing comprising a diaphragm 45 secured therein and defining two pressure chambers 46 and 47. Springs 48 bias the diaphragm 45 to a normal position in which the diaphragm, through stems 49, maintains closed a set of release contacts 50 while maintaining open a set of application contacts 51. These two sets of contacts are suitably insulated from the casing and other grounded parts as is shown in the drawing.

When fluid under pressure is supplied to the upper chamber 46 the diaphragm 45 is actuated downwardly to open the release contacts 50 and to close the application contacts 51. When thereafter fluid under pressure is supplied to the lower chamber 47 to a degree slightly below that supplied to the chamber 46, diaphragm 45 will move upwardly to open the application contacts 51 and to at the same time maintain open the release contacts 50. If the pressure in chamber 47 should rise to a degree equal to or greater than the pressure in chamber 46 release contacts 50 will be closed.

The brake valve device 14 comprises a self-lapping portion 54 and a rotary valve portion 55, which two portions are assembled with casing members to define a pressure chamber 56.

The self-lapping portion is provided with a supply valve 57 urged toward a seated position by a spring 58. When the supply valve 57 is unseated fluid under pressure may flow from a feed valve device 59, which is connected to a main reservoir 60 by way of a pipe 61 having a restriction 62 therein, by way of pipe 63 and passage 64 to the pressure chamber 56. When the supply valve 57 is seated this flow is cut off.

Disposed in a chamber 65 in the self-lapping portion is a movable abutment 66, which is subject on one side to pressure of fluid supplied to the pressure chamber 56 and on the other side to pressure of a regulating spring 67. Contained interiorly of the movable abutment 66 is a release valve 68, which is urged toward an unseated position by action of a spring 69. When the release valve 68 is unseated, a communication is established between the pressure chamber 56 and the atmosphere, by way of passages 70 and 71, chamber 65, and exhaust port 72. When the release valve 68 is seated this communication is closed.

Tension on the regulating spring 67 may be regulated by a regulating member 73, which has associated therewith an adjustable stop 74 for determining movement of the movable abutment to the right by engaging a stem 75 associated with the movable abutment.

For unseating the supply valve 57 and seating the release valve 68, there is provided a mechanism including spaced levers 77 pivotally secured to and carried by a plunger 78 slidable in a bore 79 in the casing. The upper ends of the spaced levers 77 carry a stem 80, one end of which is adapted to engage the supply valve 57. The lower ends of the spaced levers 77 carry a roller 81 for engaging the end of the release valve 68.

When the plunger 78 is actuated to the right, due to the fact that the release spring 69 is made lighter than either the supply spring 58 or the regulating spring 67, the spaced levers 77 pivot about their upper ends and effect seating of the release valve 68. Thereafter, upon further movement of the plunger 78 the spaced levers 77 pivot about their lower ends and effect unseating of the supply valve 57. The regulating spring 67 is preferably designed to be unappreciably compressed during this operation, so that the supply valve 57 is unseated approximately to a degree corresponding to the movement of the plunger 78 to the right.

After the plunger 78 has been moved to some chosen position to the right, the pressure of fluid thus supplied to the pressure chamber 56 by the unseating of supply valve 57 will act upon the movable abutment 66 and gradually move it to the right as the pressure increases. The spaced levers 77 will be rocked about their pivotal connection with the plunger 78, to seat the supply valve 57 at a pressure in the chamber 56 as determined by the tension on spring 67 and the degree of movement of the plunger 78 to the right.

For moving the plunger 78 to the right there is provided a cam 82 secured to an operating shaft 83, which is rotatable upon movement of a handle 84 from a release position into a service application zone. The parts are so designed that as the handle 84 is moved into the application zone the cam 82 progresssively actuates the plunger 78 to the right, and the closing of the supply valve 57 takes place at a pressure corresponding substantially to the degree or extent of movement of the handle 84. The pressure established in chamber 56 therefore corresponds substantially to the position of handle 84 in the service application zone.

The rotary valve portion 55 comprises an inner casing defining a rotary valve chamber 105 in which is disposed a rotary valve 106 operated by the aforementioned shaft 83. A spring 107 assists in holding the rotary valve 106 upon its seat. The chamber 105 is in constant open communication with the feed valve device 59 by way of passage 108 and the aforementioned pipe 63.

In the release position of the brake valve handle 84, a port 109 in the rotary valve connects chamber 105 and feed valve device 59 to the brake pipe 15. When the handle 84 has been moved beyond the service application zone to either a pneumatic service or an emergency position, the rotary valve 106 disconnects the brake pipe 15 from the chamber 105, and reconnects the brake pipe to an exhaust passage 110, to vent the brake pipe to the atmosphere. However, for all positions of the handle 84 in the service application zone the brake pipe remains connected to the chamber 105.

The feed valve device 59 is preferably one of the types commonly employed in fluid pressure brake systems, the function of which, as is well known in the art, is to maintain a constant pressure of fluid supplied from the main reservoir 60.

The retardation controller device 16 is embodied in a casing having a pendulum 86 pivotally mounted at 87 and having secured thereto and insulated therefrom two contacts 88 and 89. The pendulum is normally biased against a stop 90, in which position the contact 89 engages and bridges two stationary contacts 91.

The retardation controller device is preferably positioned on the vehicle so that when the vehicle is decelerating the pendulum 86 is urged to the left. As the pendulum moves to the left, contact 89 disengages from contact 91 and thereafter the other movable contact 88 engages and bridges stationary contacts 92.

Movement of the pendulum to the left is opposed by a spring compressed plunger 93, which is at all times urged into contact with the pendulum by a spring 94. The spring 94 only opposes movement of the pendulum up to the point where contact 89 disengages from contacts 91, and at this point a flange 95 on the plunger 93 engages a washer 96, and thereafter movement of the pendulum is also opposed by another spring 97.

The tension on the spring 94 may be varied by varying pressure applied to an abutment 98, through actuation of a lever 99. The lever 99 is pivotally mounted intermediate its ends at 100 to some element of the retardation controller casing. A roller 85 in one end of the lever 99 bears upon the abutment 98 while the other end of the lever is connected to a piston 101 disposed in a piston chamber 102. A spring 103 urges the piston 101 to the right. When fluid under pressure is supplied to the piston chamber 102 the piston 101 is actuated to the left, thereby rocking lever 99 about its pivot 100 and increasing the tension on spring 94. The limit to which this tension may be increased is reached when a stem 104 associated with the movable abutment 98 engages the inside wall of the plunger 93.

Now the parts are so arranged that regardless of the tension placed on spring 94, when pendulum 86 has overcome this tension and caused contact 89 to disengage from contacts 91, a constant increment of force only will be required to compress spring 97 and further compress spring 94 sufficiently for contact 88 to engage contacts 92. Therefore, the increment of retardation required to move the pendulum between disengagement of contacts 89 and 91 and engagement of contacts 88 and 92 will be constant, regardless of the retardation required to first cause disengagement of contacts 89 and 91.

The application holding valve device 17 is embodied in a casing having a diaphragm 112 defining two chambers 113 and 114. Suitably secured to the diaphragm 112 is a stem 115 which is recessed to receive a slide valve 116, so as to move the slide valve coextensive with movement of the diaphragm. The stem 115 is provided with a flanged shoulder 117 for engaging the bottom side of chamber 114 to limit the downward movement of the slide valve 116.

Disposed in the chamber 113 is a spring 118 which acts upon the diaphragm 112 to urge it downwardly. Stems 119 and 120 interfitting with bores 121 and 122, respectively, serve to guide movement of the diaphragm.

The chamber 114 is connected by pipe and passage 124 to a main reservoir pipe 125, which is connected to the main reservoir 60. The chamber 114 is also at times connected by a pipe and passage 126 to a check valve device 127, which in turn is connected by pipe 128 to the auxiliary reservoir 35.

When the diaphragm 113 is in its uppermost position, as shown, a cavity 111 in slide valve 116 connects passage 126 to exhaust port 123. When the diaphragm is in its lowermost position the slide valve 116 uncovers passage 126. Intermediate these two positions the slide valve laps the passage.

Another check valve device 127 is connected to the main reservoir pipe 125 through pipe 129, and is also connected to a supply reservoir 130 through pipe 131. Each of the check valve devices 127 is provided with a ball valve 132 urged toward a seated position by a spring 133. As will be observed from the drawing, each check valve device permits the flow of fluid in one direction only.

Connected between the magnet valve device 11 and the automatic valve device 12, and to the brake cylinder 10, is a double check valve device 134. This check valve device has a shiftable slide valve 135 for establishing communication between a straight air pipe 136 and a brake cylinder pipe 137 leading to the brake cylinder 10, or between a pipe 138 from the automatic valve device 12 to the brake cylinder pipe 137.

When the invention is adapted to a braking equipment for a train, at least one brake cylinder 10, a double check valve device 134, a magnet valve device 11, an automatic valve device 12, an auxiliary reservoir 35, a supply reservoir 130, an application holding valve device 17, and two check valve devices 127 are provided on each car of the train, while the other parts shown are provided only on the head end or control car. The brake pipe 15 and main reservoir pipe 125 extend throughout the train in the usual manner and connect to the devices on each train as indicated in the drawing.

The operation of this embodiment of my invention is as follows.

*Charging and running condition*

When the brake equipment is being put into service for the first time, fluid under pressure is supplied to the main reservoir 60 from the usual type compressor (not shown). From the main reservoir fluid under pressure will flow through the main reservoir pipe 125 to chamber 114 in the application holding valve device 17. Before the equipment is charged spring 118 will have actuated diaphragm 112 downwardly, so that slide valve 116 now uncovers passage 126. Therefore, as fluid under pressure flows from the main reservoir pipe 125 to chamber 114, it flows through pipe and passage 126 to the check valve device 127, where it unseats ball valve 132, and then flows through pipe 128 to the auxiliary reservoir 35 and the slide valve chamber 27 of the automatic valve device 12.

The pressure of the fluid in the slide valve chamber 27 actuates piston 31 upwardly, compressing the graduating stop spring 41, thereby causing main slide valve 29 to uncover passage 42. Fluid then flows from the chamber 27 to the double check valve device 134, where it shifts the slide valve 135 to the left and then flows through pipe 137 to the brake cylinder 10. During initial charging of the system therefore the brakes are initially applied.

From the main reservoir 60, fluid under pressure also flows through the restriction 62 and pipe 61 to the feed valve device 59, from whence it flows through pipe 63 and passage 108 to chamber 105. With the brake valve handle 84 in release position or some position in the service application zone, fluid will flow from chamber 105 through port 109 to the brake pipe 15. From the brake pipe 15 fluid under pressure will flow through pipe and passage 36 to the piston chamber 28 in the automatic valve device.

Due to the presence of the restriction 62 and feed valve device 59 in this communication to the brake pipe, the pressure in the brake pipe 15 and piston chamber 28 will build up somewhat slower than the pressure in the slide valve chamber 27. However, when the pressure in chamber 114 of the application holding valve device 17 reaches a predetermined value, it will have actuated diaphragm 112 upwardly far enough to have shifted slide valve 116 to the position where passage 126 is lapped. The supply of fluid to chamber 27 will therefore be cut off.

As the pressure in the piston chamber 28 continues to rise, the pressure above piston 31 will soon overbalance that below and the piston will move downwardly to release position, where cavity 140 in slide valve 29 connects passage 42 to exhaust port 141, to release fluid under pressure from the brake cylinder 10 to the atmosphere. When the system is fully charged the position of the parts of the application holding valve device 17 will be as shown. It will thus be seen that in charging up the system for the first time, or at any time when the system has become wholly discharged, the brakes are first applied and held applied until the system has been charged to a predetermined degree, this degree preferably being such that if no further charging took place the system would be adequately charged to insure a brake application great enough to stop the train.

When the parts of the automatic valve device 12 are in release position, as shown in the drawing, the auxiliary reservoir 35 will be charged to normal pressure value through the feed groove 39. The supply reservoir 130 is charged from the main reservoir pipe 125 through the check valve device 127 connected therebetween. In both check valve devices 127 I prefer to make spring 133 such that a chosen differential of pressure, as for example ten or twenty pounds, will be required to unseat the ball valve, so that as the fluid expands in passing into the supply and auxiliary reservoirs such moisture as is contained therein will be deposited in these reservoirs, from which it may be drained off.

When the brake system has been fully charged, the parts will assume the positions shown in the drawing. While the train is running, of course, the brake valve handle 84 is maintained in the release position, in which position the brake pipe 15 is maintained charged to feed valve pressure through the communication already described.

*Electropneumatic service application*

When it is desired to effect a normal or electropneumatic service application of the brakes, the brake valve handle 84 is moved into the service application zone to a degree or an extent according to the desired degree of braking. When the brake valve handle is thus moved, the release valve 68 is first seated and then the supply valve 57 is unseated as previously described. Fluid under pressure will then be supplied to the pressure chamber 56 to a degree corresponding to the brake valve handle movement.

From chamber 56 fluid under pressure will flow through control pipe 142 to chamber 46 in the pneumatic switch device 13. The pressure of fluid thus supplied to this chamber will actuate diaphragm 45 downwardly to open release contacts 50 and to thereafter close application contacts 51. Opening of release contacts 50 deenergizes the release electromagnet in the magnet valve device 11, by interrupting a circuit thereto from a battery 143, which circuit includes conductor 144, contacts 50, conductors 145 and 146, the release electromagnet and ground connection 147.

Closing of application contacts 51 effects energization of the application electromagnet in the magnet valve device 11 by completing a circuit thereto from the battery 143, which circuit includes conductor 144, contacts 51, conductor 148, retardation controller contacts 89 and 91, conductors 149 and 150, the application electromagnet and ground connection 147.

Deenergization of the release electromagnet effects seating of the release valve 23, thus closing a communication between the straight air pipe 136 and the atmosphere, which communication included pipe and passage 151, and exhaust port 152.

Energization of the application electromagnet effects unseating of the supply valve 20, and fluid under pressure then flows from the supply reservoir 130 through pipe 153, past the unseated supply valve 20, and through pipe and passage 151 to the straight air pipe 136. From the straight air pipe 136 fluid under pressure flows to the double check valve device 134, where it shifts the slide valve 135 to the right and then flows through brake cylinder pipe 137 to the brake cylinder 10.

From the straight air pipe 136 fluid under pressure also flows to the lower chamber 47 in the pneumatic switch device 13. When the pressure in chamber 47 is slightly below that in chamber 46, diaphragm 45 will move upwardly to open contacts 51 and thus interrupt the circuit to the application electromagnet. When this takes place the brake application will be lapped and the brakes will be thus applied to a degree according to the degree or extent of movement of the brake valve handle 84.

As previously explained, for any position of the brake valve handle 84 in the service application zone the brake pipe 15 is maintained connected to the feed valve device 59.

Fluid under pressure supplied to the control pipe 142 from the brake valve device 14 also flows to piston chamber 102 in the retardation controller device 16. The pressure of fluid thus supplied to this chamber actuates piston 101 to the left to increase the tension on spring 94 according to the pressure in the control pipe 142. Since the pressure in control pipe 142 at all times corresponds to the position of brake valve handle 84, it follows that the tension placed on the spring 94, and hence the setting of the retardation controller device, also corresponds to brake valve handle position.

With the brakes applied as described the train will begin to decelerate, and if the rate of retardation should increase to a degree where pendulum 86 of the retardation controller device is urged to the left far enough for contact 89 to disengage from contacts 91, then the circuit to the application electromagnet in the magnet valve device will be interrupted, so that the degree of brake application cannot thereafter increase unless the brake valve handle 84 is actuated further into the service application zone.

If the retardation is great enough for pendulum 86 to be swung to the left far enough for contact 88 to engage and bridge contacts 92, then a by-pass circuit is established to the release train conductor 145, which by-pass circuit includes beginning at battery 143, conductors 144 and 154, retardation controller contacts 88 and 92, and conductor 155. The release electromagnet in the magnet valve device 11 will thus be again energized to effect unseating of the release valve 23. Unseating of this release valve reestablishes the communication from the straight air pipe 136 to the atmosphere, to release fluid under pressure from this pipe and thus diminish the degree of brake application. The brake application will diminish until pendulum 86 swings to the right far enough to interrupt the by-pass circuit described. When this takes place the brake application will again be lapped.

A little thought will show that the retardation controller device will thus function to prevent a brake application from producing a rate of retardation in excess of that determined by the position of the brake valve handle 84.

When it is desired to effect a release of the brakes, the brake valve handle 84 is turned to the release position. In this position the release valve 68 will be unseated to release fluid under pressure from the control pipe 142, and chamber 46 of the switch device 13, to the atmosphere. Release contacts 50 are thus closed to effect the release of the brake application.

*Pneumatic service application*

If for any reason the electropneumatic portion of the brake equipment described should be rendered inoperative, a service application may be made by moving the brake valve handle 84 to the pneumatic service position and letting it remain there until the brake pipe pressure will have been reduced at a service rate to a degree acccording to the desired degree of application of the brakes.

As the pressure in the brake pipe reduces, and accordingly that in the piston chamber 28 of the automatic valve device 12, the overbalancing pressure in the slide valve chamber 27 will actuate the piston 31 upwardly until it engages and is arrested by the graduating stop 40. As before explained, when this takes place port 38 in slide valve 49 will have been brought into registration with the passage 42, and graduating valve 30 will have uncovered port 38. Fluid under pressure will then flow from the slide valve chamber 27 and auxiliary reservoir 35, through port 38, passage 42 and pipe 138 to the double check valve device 134, where slide valve 135 will be shifted to the left, and then through pipe 137 to the brake cylinder 10.

As the pressure in slide valve chamber 27 approaches equalization with the pressure in piston chamber 28, piston 31 will move downwardly and shift graduating valve 30 to lap position where port 38 will be blanked.

Since the retardation controller device 16 controls only the magnet valve device 11, it will be obvious that the rate of retardation will not be limited by this device. However, the degree of brake application during a pneumatic service application will in general not be great enough to produce sliding of the wheels, so that this lack of retardation control does not present a serious disadvantage.

When it is desired to release the brakes following this type of application, the brake valve handle 84 is returned to release position, in which position the brake pipe 15 is again connected to the feed valve device 59. As the brake pipe pressure is thus restored, piston 31 will move to release position, and the brake cylinder 10 thus connected through cavity 140 of slide valve 29 to exhaust port 141.

*Emergency application*

When it is desired to effect an emergency application of the brakes, the brake valve handle 84 is moved to and left in the emergency position, where the brake pipe will be vented rapidly to the atmosphere, and the maximum pressure will be established in pressure chamber 56. Assuming that all portions of the brake equipment are fully operative, both the electropneumatic and the automatic portions will operate in the manner already described for the two types of service application. Due to the brake pipe pressure being reduced rapidly, piston 31 of the automatic valve device 12 will, however, move upwardly compressing the graduating stop spring 41 until it seals against gasket 43. It will therefore be apparent that the magnet valve device 11 will connect supply reservoir 130 to the left side of the double check valve device 134, while the automatic valve device 12 will connect the auxiliary reservoir 35 to the right side.

Now since the magnet valve device 11 is under control of the retardation controller device 16 it is preferable that the pressure of fluid supplied by the magnet valve device shall exceed the pressure of fluid supplied by the automatic valve device, so that the slide valve 135 in the double check valve device 134 will be actuated to the right and fluid will flow from the supply reservoir 130 to the brake cylinder 10 to effect a brake application. The brake application will therefore be controlled by the retardation controller device in the same manner as described for the electropneumatic service application, the retardation controller device being conditioned by the supply of fluid under pressure from the control pipe 142 to the piston chamber 102 to permit the maximum permissible rate of retardation.

In case there should be a subsequent failure of the electropneumatic portion, such that the brake application tends to diminish, slide valve 135 in the double check valve device 134 will be shifted to the left and the brake application will be maintained by the supply of fluid under pressure from the auxiliary reservoir to the brake cylinder. It will thus be seen that the brake application is assured by the operation of both the electropneumatic or straight air portion and the automatic portion.

When it is desired to effect a release of the brakes following an emergency application, the brake valve handle 84 is returned to the release position, and the release will be effected in the manner as heretofore described for a service application.

While I have described my invention with particular reference to one embodiment thereof, it is to be understood that I do not intend to be limited to the specific construction and arrangement of parts as shown, or otherwise than by the spirit and scope of the appended claims.

Having now described my invention, what I claim as new and desire to secure by Letters Patent, is:

1. In a vehicle brake system, in combination, brake means, a control pipe to which fluid under pressure is supplied to effect an application of said brake means, means for effecting a supply of fluid under pressure to said control pipe, a retardation controller device for limiting the degree of application of said brake means, and means for adjusting the setting of said retardation controller device directly according to the pressure of fluid supplied to said control pipe.

2. In a vehicle brake system, in combination, brake means, a switch device having a chamber and being operable to control the degree of application of said brake means according to the pressure of fluid supplied to said chamber, a retardation controller device operated according to the rate of retardation of the vehicle and being adjustable to permit different maximum rates of retardation, and means for adjusting the setting of said retardation controller device directly according to the pressure of fluid supplied to said chamber.

3. In a vehicle brake system, in combination, brake means, a control pipe adapted to have fluid under pressure supplied thereto to effect and control the degree of application of said brake means, means for controlling the degree of fluid under pressure supplied to said pipe, a retardation controller device having an element movable according to the rate of retardation of the vehicle, means controlled by said element for controlling the degree of application of said brake means, and means for opposing movement of said element directly according to the degree of pressure in said control pipe.

4. In a vehicle brake system, in combination, a brake cylinder, a control pipe, means for supplying fluid under pressure to said control pipe according to a desired degree of application of the brakes, means for effecting a supply of fluid under pressure to said brake cylinder according to the degree of pressure in said control pipe, a retardation controller device for limiting the pressure established in said brake cylinder according to a selected rate of retardation, and means for adjusting said retardation controller device to select a rate of retardation corresponding directly to the pressure of fluid in said control pipe.

5. In a vehicle brake system, in combination, brake means, a control pipe, a self-lapping valve device operable to supply fluid under pressure to said pipe to a degree according to the degree of operation thereof, means responsive to the pressure of fluid in said pipe for effecting an application of said brake means to a corresponding degree, a retardation controller device for limiting the degree of application of said brake means, and means responsive to fluid in said control pipe for adjusting the setting of said retardation controller device according to the degree of pressure in said control pipe.

6. In a vehicle brake system, in combination, brake means, electroresponsive means for controlling application of said brake means, a control pipe, a pneumatic switch device responsive to the pressure of fluid supplied to said pipe for controlling said electroresponsive means, a retardation controller device for also controlling said electroresponsive means to limit the degree of application of said brake means according to a selected rate of retardation, and means for adjusting the setting of said retardation controller device according to the pressure of fluid supplied to said control pipe.

7. In a vehicle brake system, in combination, a brake cylinder, electroresponsive valve means for controlling the supply of fluid under pressure to and its release from said brake cylinder, a pneumatic switch device controlling energization and deenergization of said electroresponsive valve means, means for supplying fluid under pressure to effect operation of said pneumatic switch device, contact means for also controlling energization and deenergization of said electroresponsive valve means, and means operable at a rate of retardation corresponding to a pressure equal to or greater than that of the fluid supplied to operate said switch device for transferring control of said electroresponsive valve means from said pneumatic switch device to said contact means.

8. In a vehicle brake system, in combination, a brake cylinder, electroresponsive valve means operable when energized to effect a supply of fluid under pressure to said brake cylinder, a pipe adapted to have fluid under pressure supplied thereto, a pneumatic switch device responsive to the pressure of fluid supplied to said pipe for effecting energization of said electroresponsive valve means, normally closed contacts adapted when opened to effect deenergization of said electroresponsive valve means, means operative in accordance with the rate of retardation of the vehicle for controlling opening of said contacts, and means controlled by the pressure of fluid in said pipe for controlling operation of said last means.

9. In a vehicle brake system, in combination, a brake cylinder, means for effecting a supply of fluid under pressure to said brake cylinder, an electroresponsive valve device operable when energized to effect a release of fluid under pressure from said brake cylinder, fluid pressure operated switch means for effecting deenergization of said electroresponsive valve device, normally open contacts adapted when closed to effect energization of said electroresponsive valve device, means governed by the rate of retardation of the vehicle for controlling closing of said contacts, and fluid pressure operated means for controlling operation of said last means.

10. In a vehicle brake system, in combination, a brake cylinder, a control pipe, means for supplying fluid under pressure to said control pipe according to a desired degree of application to the brakes, means for effecting a supply of fluid under pressure to said brake cylinder according to the degree of pressure in said control pipe, a retardation controller device having an element movable according to rate of retardation of the vehicle, means governed by movement of said element for limiting the pressure established in said brake cylinder, spring means for opposing movement of said element, and means for adjusting the opposition exerted by said spring means to movement of said element directly according to the pressure of fluid in said control pipe.

11. In a vehicle brake system, in combination, brake means, a control pipe adapted to have fluid under pressure supplied thereto to effect and control the degree of application of said brake means, means for controlling the degree of fluid under pressure supplied to said pipe, a retardation controller device having an element movable according to the rate of retardation of the vehicle, electroresponsive valve means controlled by said element for controlling the degree of application of said brake means, spring means for opposing movement of said element, and means directly responsive to the degree of pressure in said control pipe for controlling the degree of opposition exerted by said spring means directly in accordance with the pressure in said pipe.

12. In a fluid pressure brake system, in combination, a brake cylinder, a brake pipe, a first valve device having a first chamber connected to said brake pipe and a movable abutment subject on one side to pressure of fluid in said first chamber and on the other side to pressure of fluid in a second chamber, said first valve device being adapted to control a communication from said second chamber to said brake cylinder, and being normally in a position to close said communication when said brake system is discharged, and a second valve device controlling a communication to said second chamber and being operable when the brake system is discharged to maintain said communication to said second chamber open and to close said communication at a predetermined pressure of fluid supplied therethrough, said first valve device being operable upon supply of fluid under pressure to said second chamber to open the said communication to said brake cylinder to permit fluid under pressure supplied to said second chamber to flow to said brake cylinder, and being operable subsequently upon supply of fluid under pressure to said first chamber from said brake pipe to close the communication to said brake cylinder.

13. In a vehicle brake system, in combination, a brake cylinder, an automatic valve device for controlling the supply of fluid under pressure to and its release from said brake cylinder, said automatic valve device having a first and a second chamber and a movable abutment subject on one side to the pressure of fluid supplied to said first chamber and on the other side to pressure of fluid supplied to said second chamber, means for supplying fluid under pressure to both of said chambers when initially charging the brake system, and means for causing the rate of supply to said second chamber to exceed that to said first chamber and to cut off the supply to said second chamber at a predetermined pressure, said automatic valve device being operable so long as the supply to said second chamber exceeds that to said first chamber to effect a supply of fluid under pressure to said brake cylinder, and to cut off said supply to said brake cylinder following cutting off of the supply to said second chamber.

14. In a vehicle brake system, in combination, a brake cylinder, a normally uncharged pipe, self-lapping means operative to cause fluid under pressure to be supplied to said pipe and a pressure to be established in said brake cylinder according to the pressure in said pipe, inertia means movable upon retardation of the vehicle for effecting release of pressure from said brake cylinder as long as the retardation of the vehicle exceeds a certain rate, and means subject to the pressure of fluid in said pipe for varying the said certain rate according to the pressure in said pipe.

ELLIS E. HEWITT.